US012781691B2

(12) United States Patent
Shi

(10) Patent No.: US 12,781,691 B2
(45) Date of Patent: Nov. 3, 2026

(54) FUEL INJECTOR SUITABLE FOR GASEOUS FUEL

(71) Applicant: PHINIA DELPHI LUXEMBOURG SARL, Belvaux (LU)

(72) Inventor: Junmei Shi, Trier (DE)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 218 days.

(21) Appl. No.: 18/715,525

(22) PCT Filed: Nov. 30, 2022

(86) PCT No.: PCT/EP2022/083935
§ 371 (c)(1),
(2) Date: May 31, 2024

(87) PCT Pub. No.: WO2023/099611
PCT Pub. Date: Jun. 8, 2023

(65) Prior Publication Data

US 2025/0043753 A1 Feb. 6, 2025

(30) Foreign Application Priority Data

Dec. 2, 2021 (GB) ..................................... 2117450

(51) Int. Cl.
*F02M 21/02* (2006.01)
*F02M 61/12* (2006.01)

(52) U.S. Cl.
CPC .... *F02M 21/0257* (2013.01); *F02M 21/0275* (2013.01); *F02M 61/12* (2013.01)

(58) Field of Classification Search
CPC . F02M 21/0257; F02M 21/0275; F02M 61/12
See application file for complete search history.

(56) References Cited

U.S. PATENT DOCUMENTS 8,950,694 B2 * 2/2015 Meyer .................. F02M 61/205 239/521
2017/0101966 A1 * 4/2017 Filippi ............... F02M 51/0607
(Continued)

FOREIGN PATENT DOCUMENTS

CN 1443271 A 9/2003
DE 1247066 B 8/1967
(Continued)

OTHER PUBLICATIONS

International Search Report for PCT/EP2022/083935 dated Mar. 3, 2024, 4 pages.
Machine assisted English translation of CN1443271A obtained from https://worldwide.espacenet.com/patent on May 30, 2024, 9 pages.
(Continued)

*Primary Examiner* — Syed O Hasan
(74) *Attorney, Agent, or Firm* — WARNER NORCROSS + JUDD LLP

(57) ABSTRACT

A fuel injector for gaseous fuels, the fuel injector comprising: an injection nozzle having a tip region that is shaped to define an annular valve seat that extends about a central outlet opening; and an outward opening injection valve needle slidably received in the injection nozzle, and operable to move between closed and open positions, the outward opening injection valve needle comprising a valve stem that defines a valve axis and a valve head extending from the valve stem, wherein the valve head comprises: a circumferential sealing region configured to seal against the valve seat and close the central outlet opening in the closed position and to define an annular gap with the valve seat in the open position, and a circumferential fuel guide region that is located downstream from the circumferential sealing region.

12 Claims, 11 Drawing Sheets

(56) References Cited

U.S. PATENT DOCUMENTS

| | | | | |
|---|---|---|---|---|
| 2017/0321636 | A1* | 11/2017 | Moser | F16K 1/38 |
| 2018/0080423 | A1* | 3/2018 | Stucchi | F02M 61/08 |

FOREIGN PATENT DOCUMENTS

| | | | |
|---|---|---|---|
| DE | 102014215870 | A1 | 2/2016 |
| EP | 1537326 | A1 | 6/2005 |
| EP | 1559906 | A2 | 8/2005 |
| FR | 2862351 | A1 | 5/2005 |
| JP | H01240763 | A | 9/1989 |
| WO | 8700584 | A1 | 1/1987 |

OTHER PUBLICATIONS

Machine assisted English translation of DE102014215870A1 obtained from https://worldwide.espacenet.com/patent on May 30, 2024, 9 pages.

Machine assisted English translation of DE1247066B obtained from https://worldwide.espacenet.com/patent on May 30, 2024, 8 pages.

Machine assisted English translation of EP1537326A1 obtained from https://patents.google.com/patent on May 30, 2024, 10 pages.

Machine assisted English translation of EP1559906A2 obtained from https://patents.google.com/patent on May 30, 2024, 5 pages.

Machine assisted English translation of FR2862351A1 obtained from https://patents.google.com/patent on May 30, 2024, 4 pages.

Machine assisted English translation of JPH01240763A obtained from https://patents.google.com/patent on May 30, 2024, 4 pages.

* cited by examiner

FUEL INJECTOR SUITABLE FOR GASEOUS FUEL

CROSS-REFERENCE TO RELATED APPLICATIONS

This application is the U.S. National Stage of International Application No. PCT/EP2022/083935 filed on 30 Nov. 2022, which claims priority to and all advantages of United Kingdom Application No. 2117450.3 filed on 2 Dec. 2021, the contents of which are incorporated herein by reference.

TECHNICAL FIELD

The present invention relates generally to a configuration of a fuel injector suitable for injecting a gaseous fuel such as hydrogen into a combustion chamber of an internal combustion engine. The injector may be suitable for injection of other fuels.

BACKGROUND

Different types of fuel injectors for gaseous fuels are known. One approach is a so-called 'inward opening' fuel injector in which an injector valve needle is configured to lift away from a valve seat against the flow direction of fuel so as to open a set of injector ports at a tip of the injector. Another approach is a so-called 'outward opening' fuel injector in which an injector valve needle, which is also known as a 'pintle', is configured to open in a direction that is the same as the fuel flow direction.

As shown by reference to an internal combustion engine 2 shown in FIG. 1, one challenge associated with an outward opening fuel injectors 4 arranged in a cylinder head 6 of the engine 2, relates to the direction of flow of the fuel after being injected into a combustion chamber 8 of the engine 2, and the effect this has on fuel-air mixing in the combustion chamber 8, and hence the efficiency of the internal combustion engine 2 as a whole.

Such outward opening fuel injectors 4 can in some circumstances produce an unstable hollow cone gas jet, which collapses either (i) in the direction of the valve axis V, i.e. towards a piston 10 of the internal combustion engine 2, as shown by arrow A or (ii) towards a cylinder head 6 of the combustion internal combustion engine 2, as shown by arrow B.

Accordingly, it is difficult to ensure consistently that the fuel is evenly dispersed throughout combustion chamber 8, and hence to ensure thorough fuel-air mixing therein. This is particularly problematic for low pressure gaseous fuels such as hydrogen, as these gases are low density and low inertia, and so air mixing is passive.

It is therefore desirable to address at least some of these issues.

SUMMARY OF THE INVENTION

Against this background, the invention provides fuel injector suitable for gaseous fuels, the fuel injector comprising: an injection nozzle having a tip region that is shaped to define an annular valve seat that extends about a central outlet opening; and an outward opening injection valve needle slidably received in the injection nozzle, and operable to move between closed and open positions, the outward opening injection valve needle comprising a valve stem that defines a valve axis V and a valve head extending from the valve stem, wherein the valve head comprises: a circumferential sealing region configured to seal against the valve seat and close the central outlet opening in the closed position and to define an annular gap with the valve seat in the open position, and a circumferential fuel guide region that is located downstream from the circumferential sealing region, the circumferential fuel guide region including a first guide portion defining a first guide surface and a second guide portion defining a second guide surface, wherein the first guide portion is configured to guide fuel injection at a smaller angle with respect to the valve axis V than the second guide portion 64.

By way of the first guide portion, the injection valve needle is able to direct some fuel towards the lower half of the combustion chamber, and hence towards the piston. Whereas, by way of the second guide portion, the injection valve needle is able to direct the remainder of the fuel towards the upper half of the combustion chamber, and hence towards the cylinder head. In this way, fuel is dispersed throughout the entire combustion chamber, fuel-air mixing is improved and hence the efficiency of the combustion engine as a whole is improved.

In a preferred embodiment, the fuel injector is a gaseous fuel injector, i.e. a fuel injector that is configured to inject gaseous fuels e.g. into a combustion chamber of an internal combustion engine. Since gaseous fuel has a lower fuel density than liquid fuel, gaseous fuel injectors are associated with a larger needle stroke than liquid fuel injectors for any particular target flow rate. This is because for gaseous fuel injectors, flow rate is determined by the throttle cross-sectional area and the pressure ratio both upstream and downstream of the throttle, such that a higher needle stroke, and hence larger throttle cross-sectional area, is required to ensure any particular flow rate. Typically, an opening stroke for a gaseous injector is between 200 microns and 600 microns. Furthermore, liquid fuel injectors are also associated with a low needle stroke to ensure sufficient atomisation in the combustion chamber.

The fuel injector, i.e. in the form of an outward opening injector, can operate at relatively low pressures for a direct injection engine. Direct injection has advantages over port fuel injection in terms of charging efficiency, and thus engine power but also in terms of efficiency. The pressure in combustion chamber can be higher than 120 bar. Contrastingly, an inward opening injector requires an operating pressure that is higher than the peak cylinder pressure to ensure the injector can remain closed after injection. Meanwhile, an outward opening injector has no injector sealing difficulty and thus can operate with a system pressure from 7 to 40 bar (as mainly determined by the flow rate requirement and jet momentum for mixing).

A first angle may be defined between a tangent of an outermost radial extent of the first guide surface and the valve axis V. A second angle may be defined between a tangent of the outermost radial extent of the second guide surface the valve axis V. Preferably, the first angle is less than the second angle.

Preferably, the first angle is between 100° and 150°, more preferably between 110° and 140°, and even more preferably between 120° and 130°. Preferably, the second angle is between 30° and 90°, more preferably between 50° and 85°, and most preferably between 60° and 80°.

A particularly effective jet separation is achieved when the difference between second angle and the first angle is at least 40°.

The second guide portion may comprise a projection. The projection may extend radially outward with respect to the first guide portion to define the second guide surface.

In a preferred embodiment, the projection extends radially outward with respect to the first guide portion by at least 10% of the total radial extension of the valve head downstream of the circumferential sealing region. More preferably, the projection radially extends by at least 15%, even more preferably by at least 25%, and most preferably by at least 30% of a total radial extension of the valve head downstream of the circumferential sealing region.

Additionally or alternatively, the projection extends radially outward with respect to the first guide portion by at least 10% of the maximum needle stroke of the injection valve needle. More preferably, the projection radially extends by at least 15%, even more preferably by at least 25%, and most preferably by at least 30% of the maximum needle stroke of the injection valve needle.

In one embodiment, the circumferential projection radially extends outward between 3 and 30 microns, and in particular between 5 and 15 microns, with respect to the first guide portion. Even microscopic projections such as these are sufficient for directing the fuel is different directions in the combustion chamber, and hence ensuring thorough air-fuel mixing. In one embodiment, a 5 micron projection is preferred.

The projection may take the form of a curved ramp or annulus portion.

The first guide surface may be substantially convex. The second guide surface may be substantially concave.

In a preferred embodiment, the valve head further comprises a circumferential common region. The circumferential common region preferably extends between the circumferential sealing region and the circumferential fuel guide region. The circumferential common region may be rotationally symmetrical with respect to the valve axis V.

The circumferential common region may define a common surface that is substantially convex.

In one particularly preferred embodiment, the fuel guide region comprises at least one pair of first guide portions and at least one pair of second guide portions. Each pair of first and second guide portions is preferably arranged on opposite sides of the valve head. This symmetrical arrangement facilitates manufacture of the injection valve needle. Each pair of first and second guide portions is preferably arranged on directly opposite sides of the valve head.

The circumferential fuel guide region preferably consists of at least one first guide portions and at least one second guide portions. In this embodiment, there are no gaps between the first and second guide portions in the circumferential fuel guide region.

In one embodiment, the first guide portion extends circumferentially over a first subtended angle $\alpha$ and the second guide portion extends circumferentially over a second subtended angle $\beta$. The first subtended angle $\alpha$ is preferably larger than the second subtended angle $\beta$. In this way, more of the fuel is directed towards the lower half of the combustion engine, and hence the piston. During compression, the piston re-directs some of this fuel back up, towards the upper half of the combustion engine. As such, the configuration of the first and second guide portions compensate for the effect of the piston, and creates a thorough dispersion of fuel and air throughout the entire combustion engine.

The first and second guide portions preferably alternate around the fuel guide region. In one embodiment, other portions may be arranged between the first and second guide portions.

In one embodiment, at least one flute is defined within the first and/or second guide portions for imparting rotational swirl to gaseous fuel passing thereover. The flute is preferably defined within the projection of the second guide portion. This is beneficial since it encourages mixing between the air and the fuel in the combustion chamber and therefore helps to improve the efficiency of the internal combustion engine. This can sometimes cause an unwanted rotational force on the pintle, leading to needle rotation.

A widest part of the first guide portion may be as wide as a widest part of the second guide portion. The widest part of the first guide portion may be located downstream of at least a portion of the widest part of the second guide portion. Such a configuration of the injection valve needle has advantages in its construction since the entire circumferential fuel guide region can be manufactured uniformly, with portions either taken away or added to form the respective first or second guide portions.

Alternatively, a widest part of the first guide portion may be less wide than a widest part of the second guide portion. The first guide portion and the second guide portion may be arranged at a same axial position along the valve axis V. Such a configuration of the injection valve needle also has advantages in its construction since the entire circumferential fuel guide region can be manufactured uniformly, with portions either taken away or added to form the respective first or second guide portions.

The invention extends to an internal combustion engine for gaseous fuels comprising a cylinder head, a piston and an engine combustion chamber, a fuel injector of any preceding claim arranged in said cylinder head and configured to guide fuel injection into the engine combustion chamber for combustion, wherein the first guide portion is configured to guide the injection jet towards the lower half of the combustion chamber and the second guide portion is configured to guide the injection jet towards the upper half of the combustion chamber.

Further optional and advantageous features are referenced in the detailed description and the appended claims.

Figure 1:
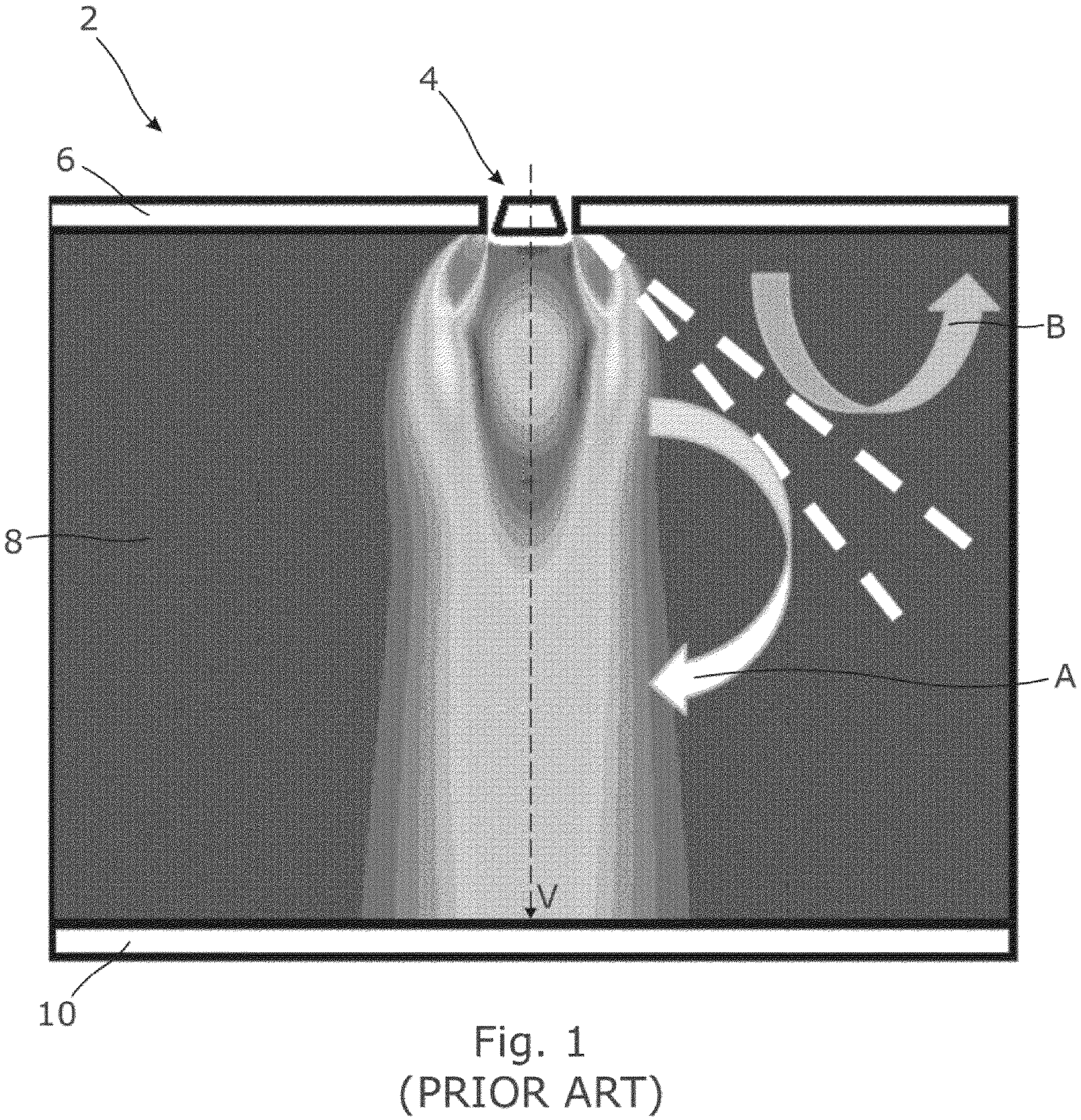
Fig. 1 (PRIOR ART)
FIG. 1 has already been described above by way of background to the invention, and is a representation of the flow of fuel after being injected by a fuel injector into a combustion chamber of an internal combustion engine.
Figure 2:
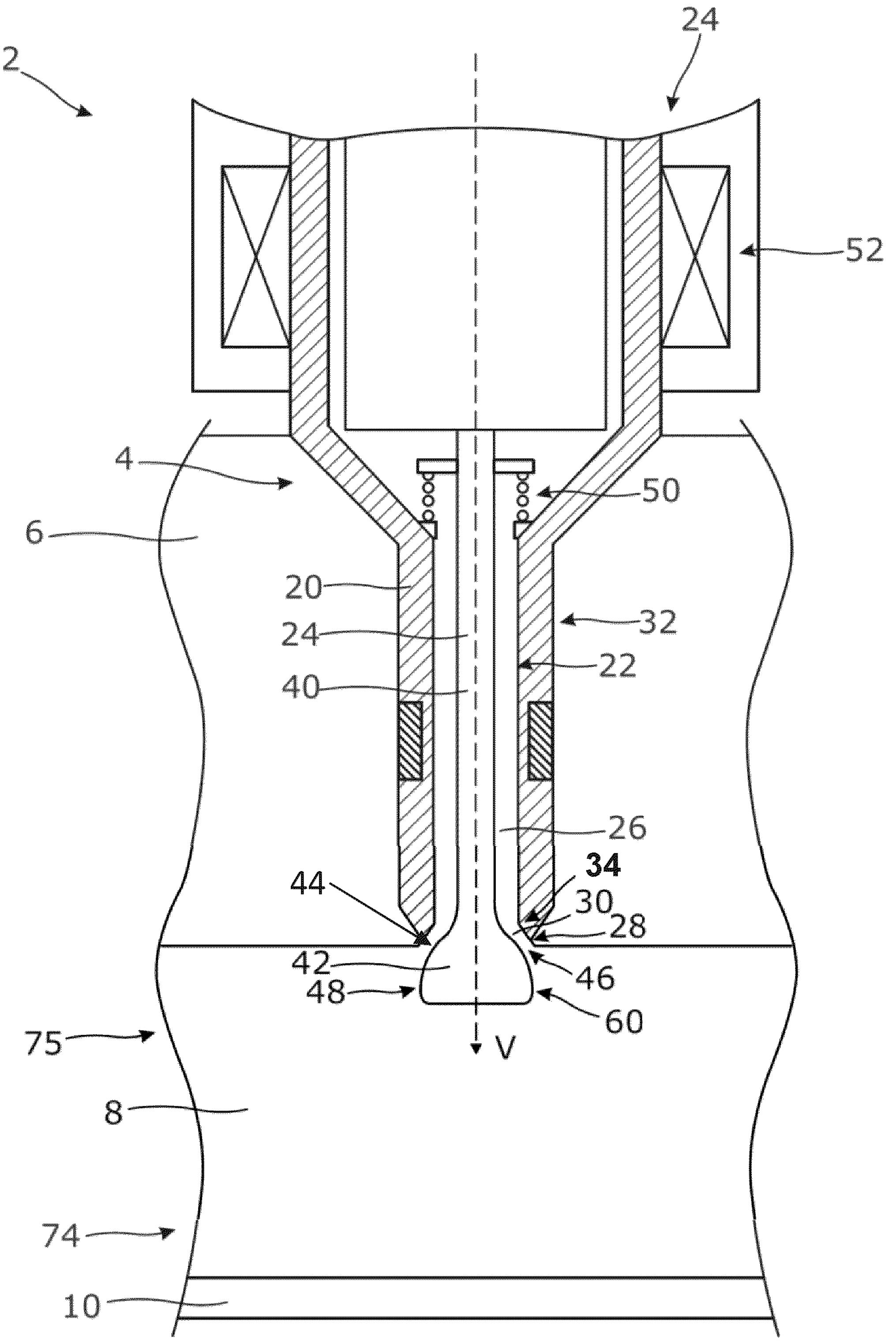
Figure 3:
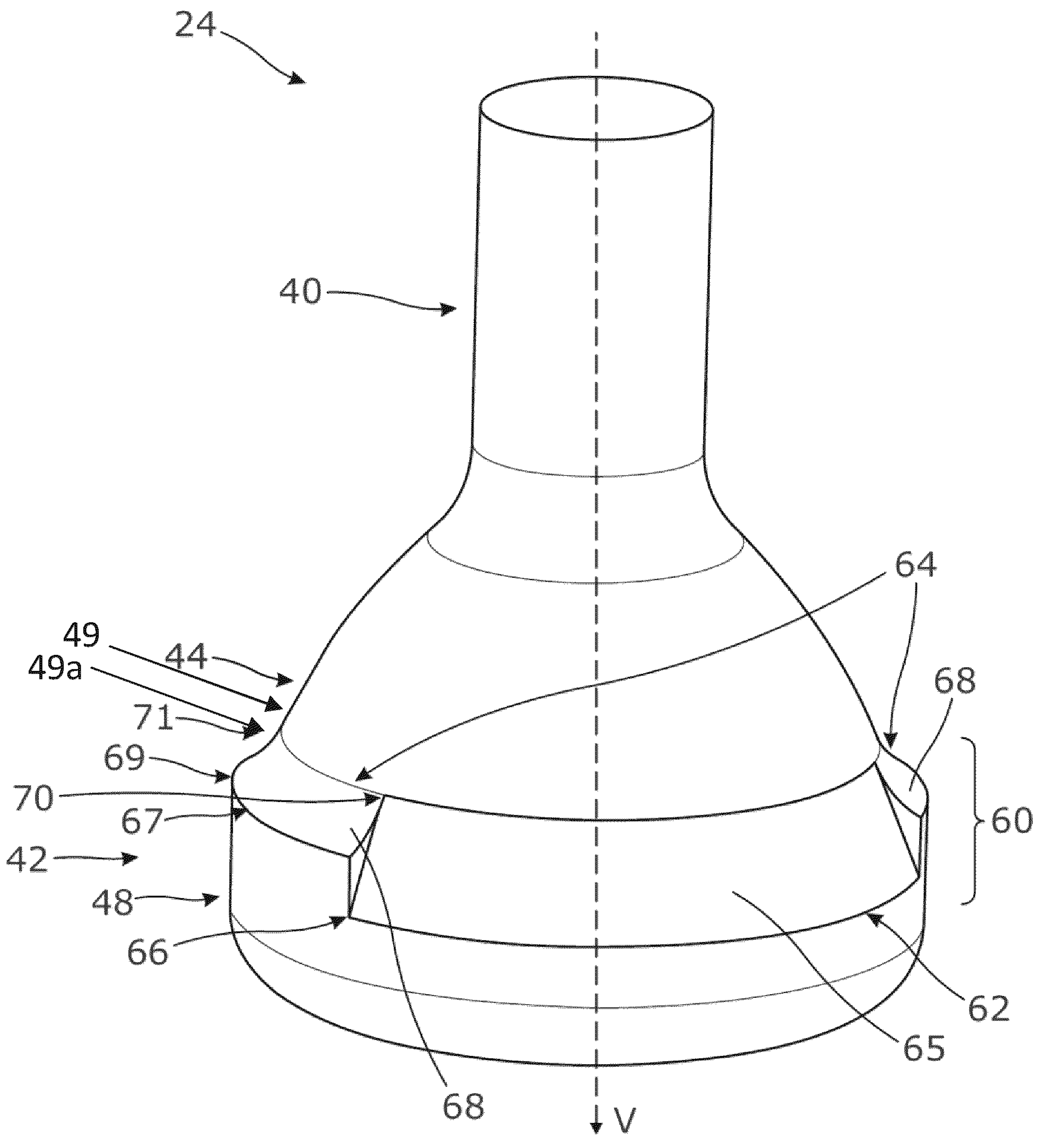
Figure 4:
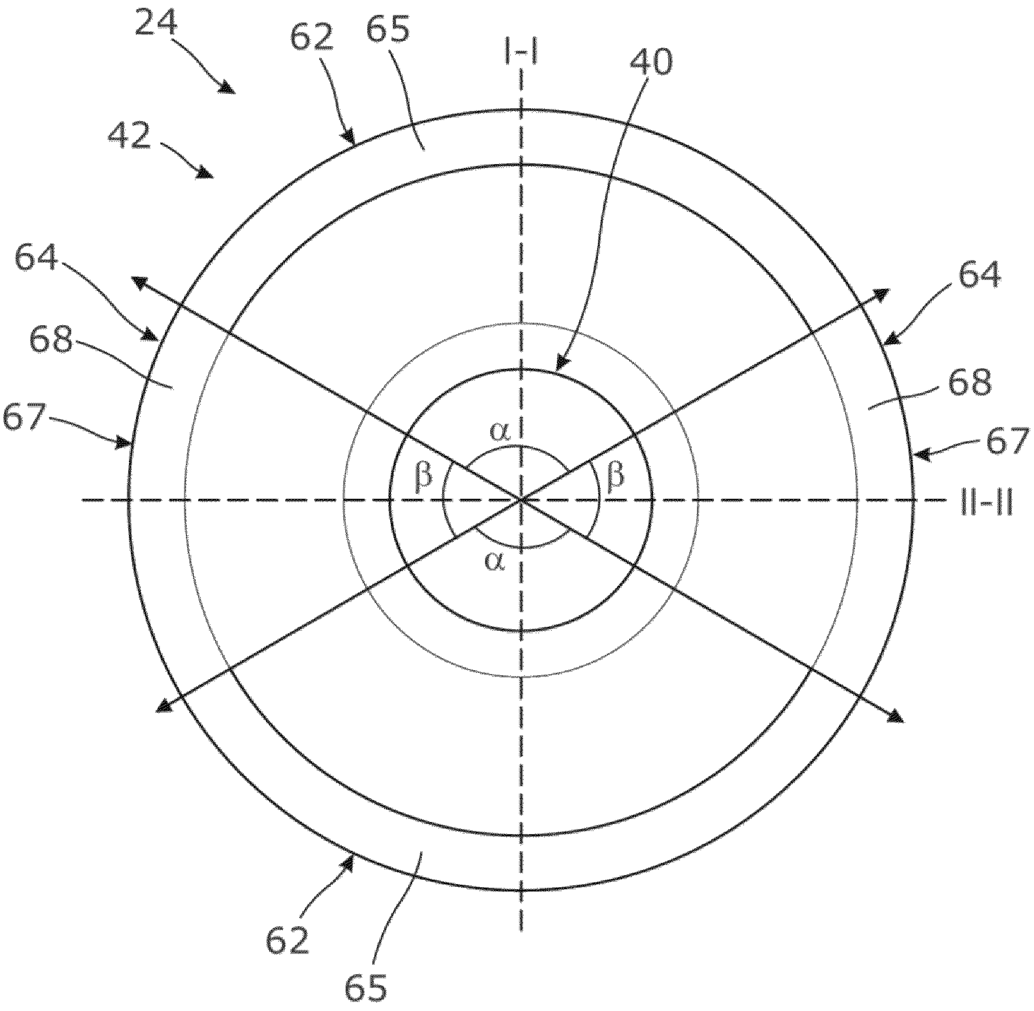
Figure 5A:
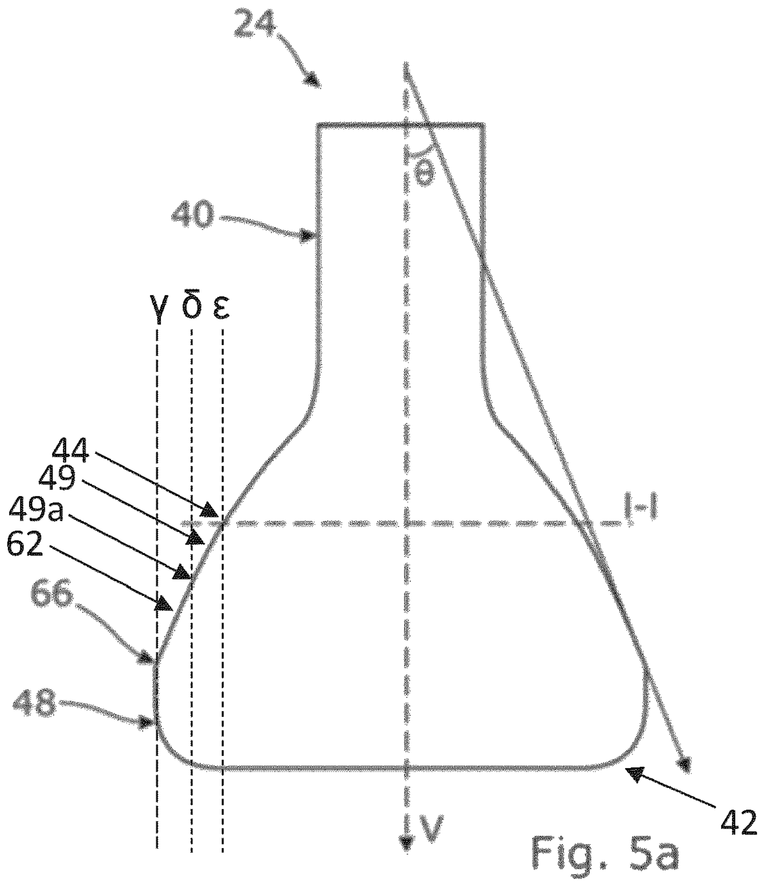
Figure 5B:
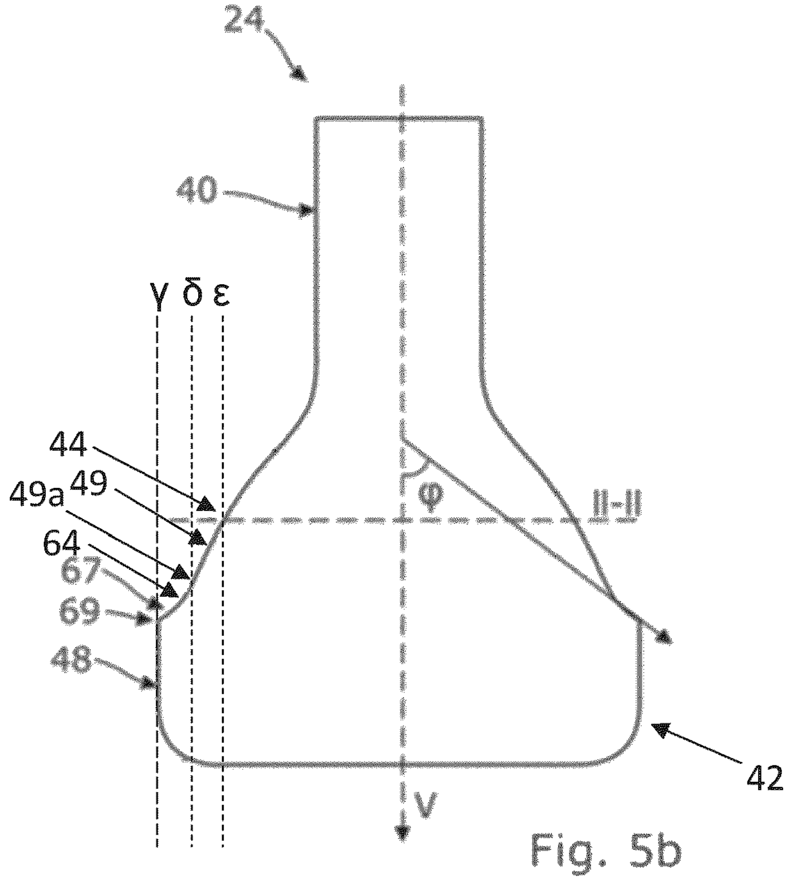
Figure 6:
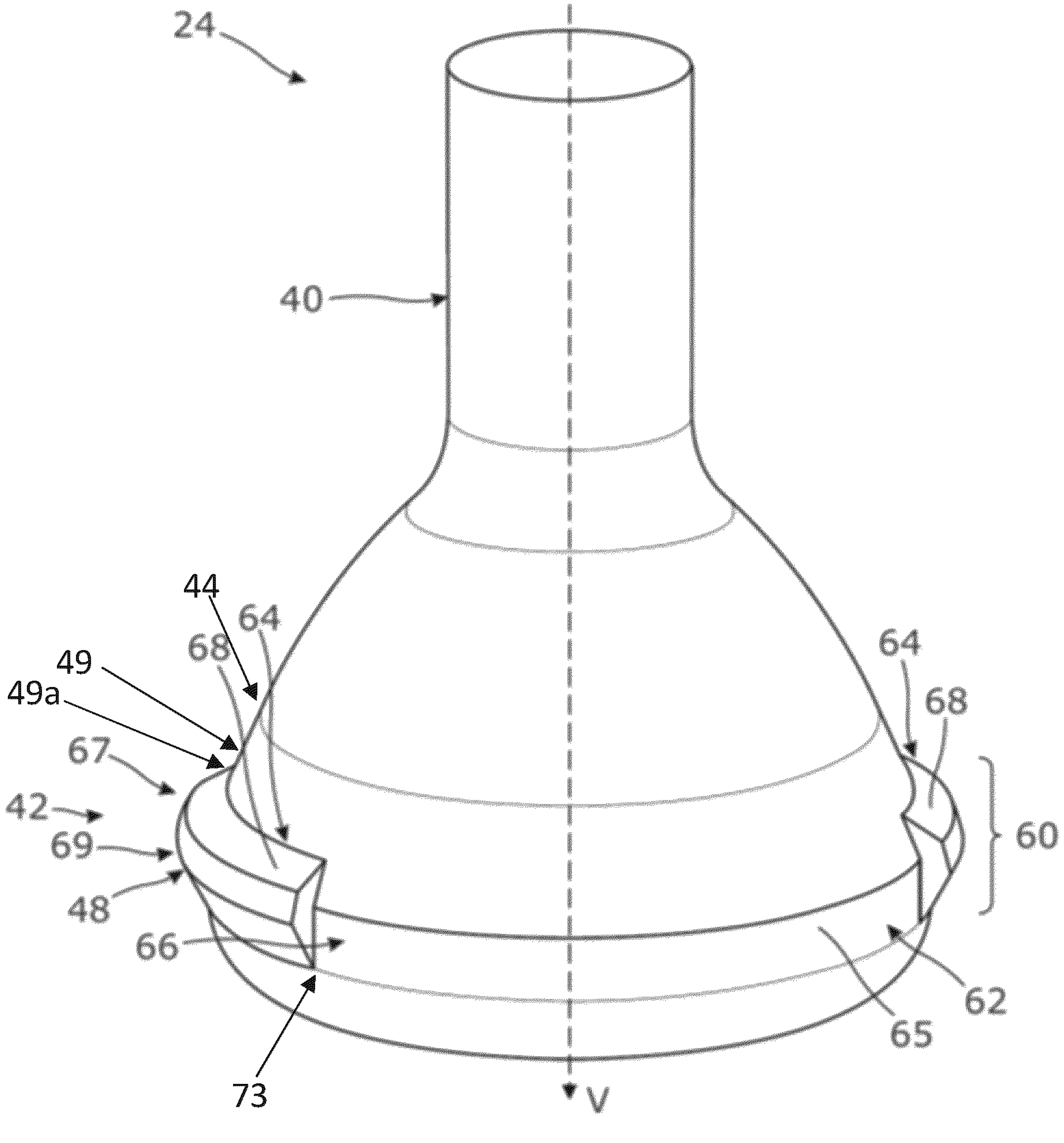
Figure 7:
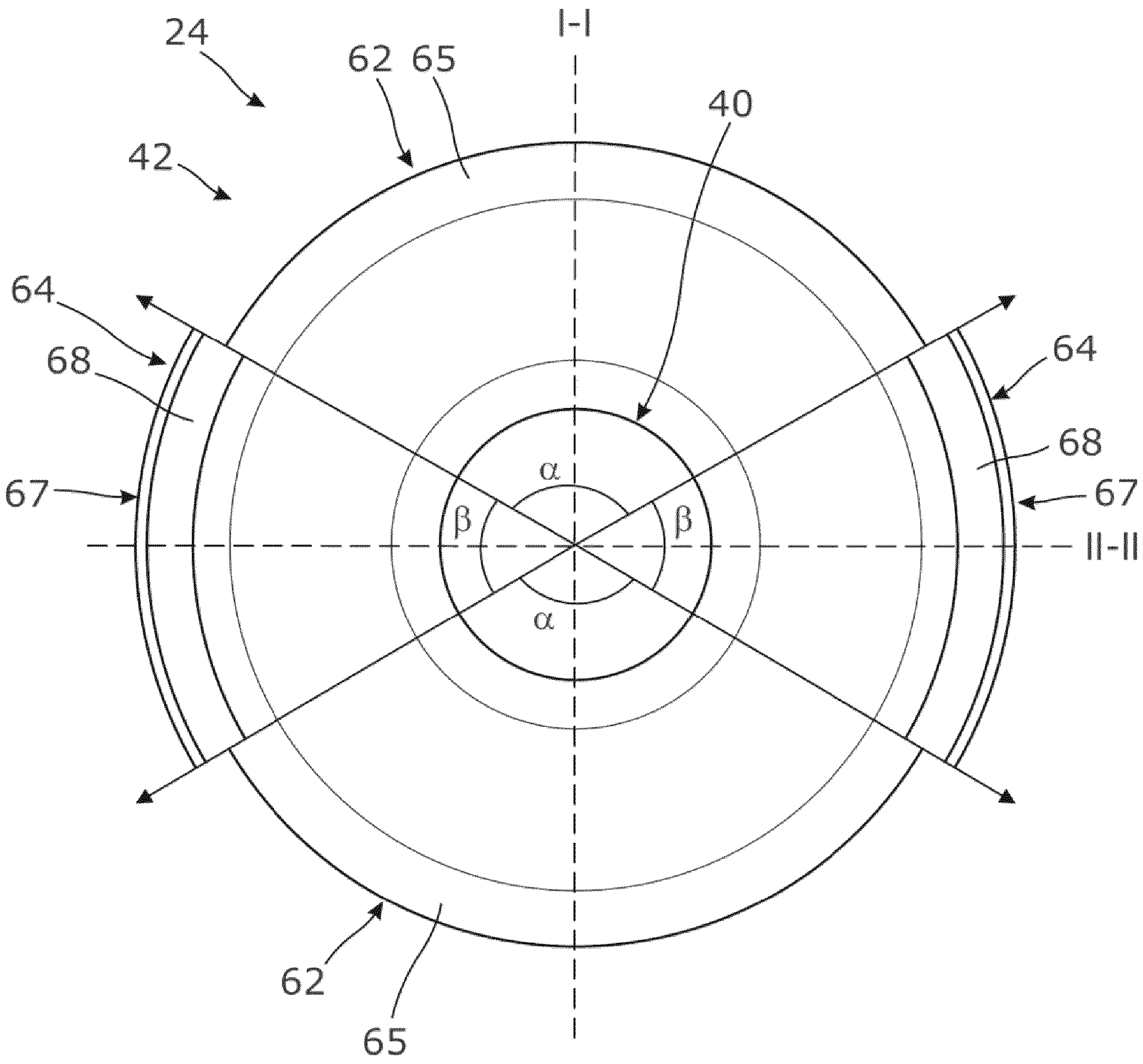
Figure 8A:
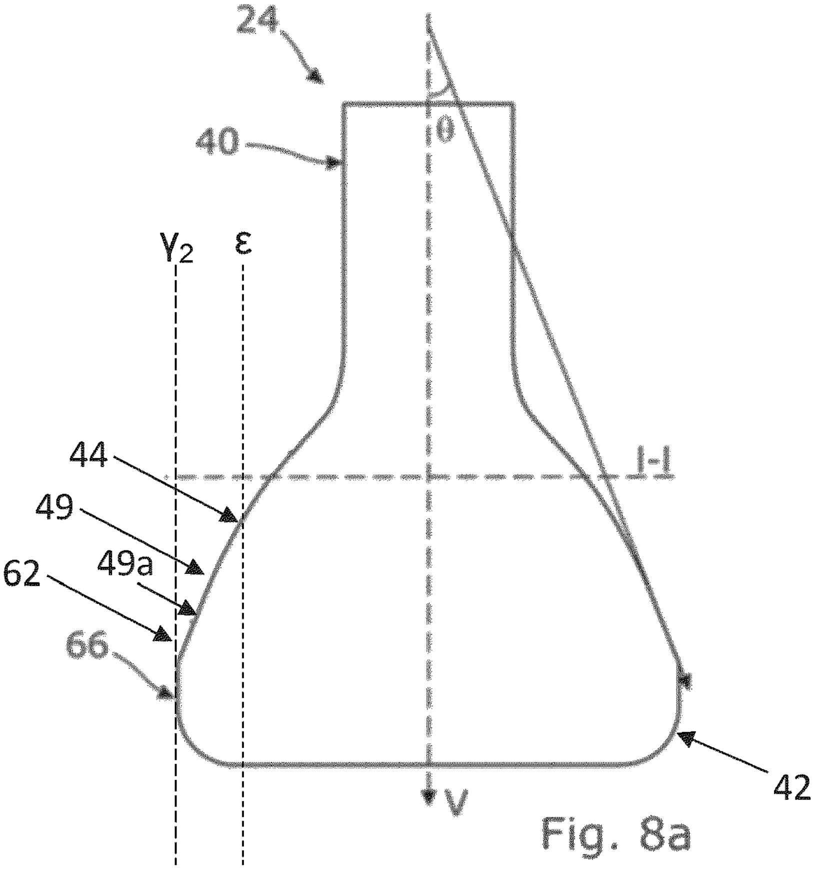
Figure 8B:
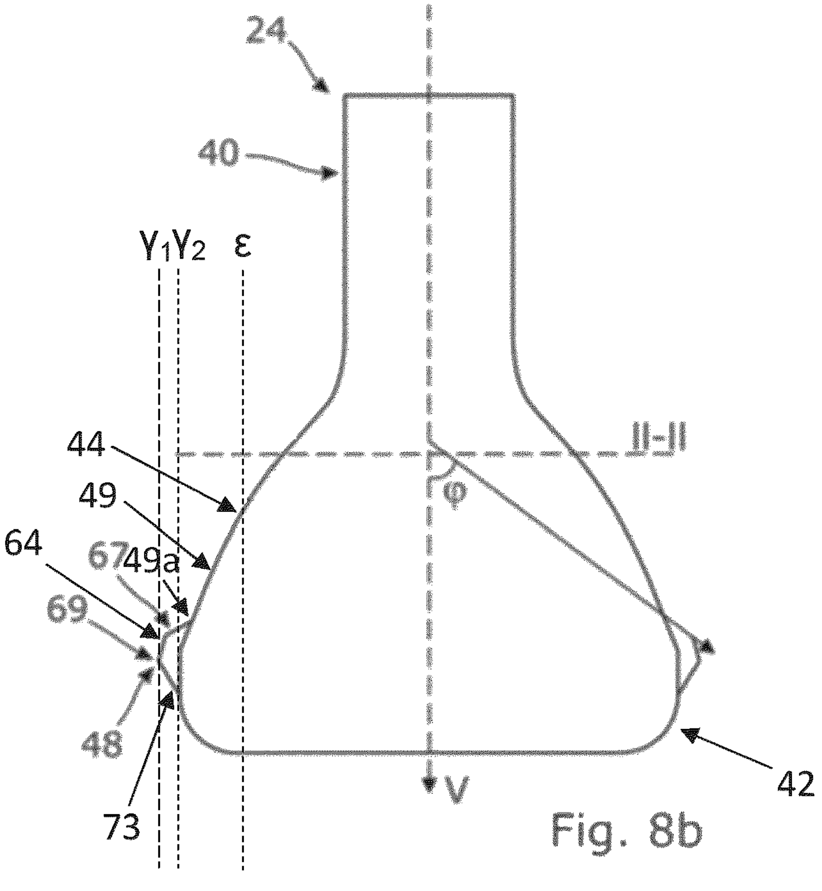
Figure 9:
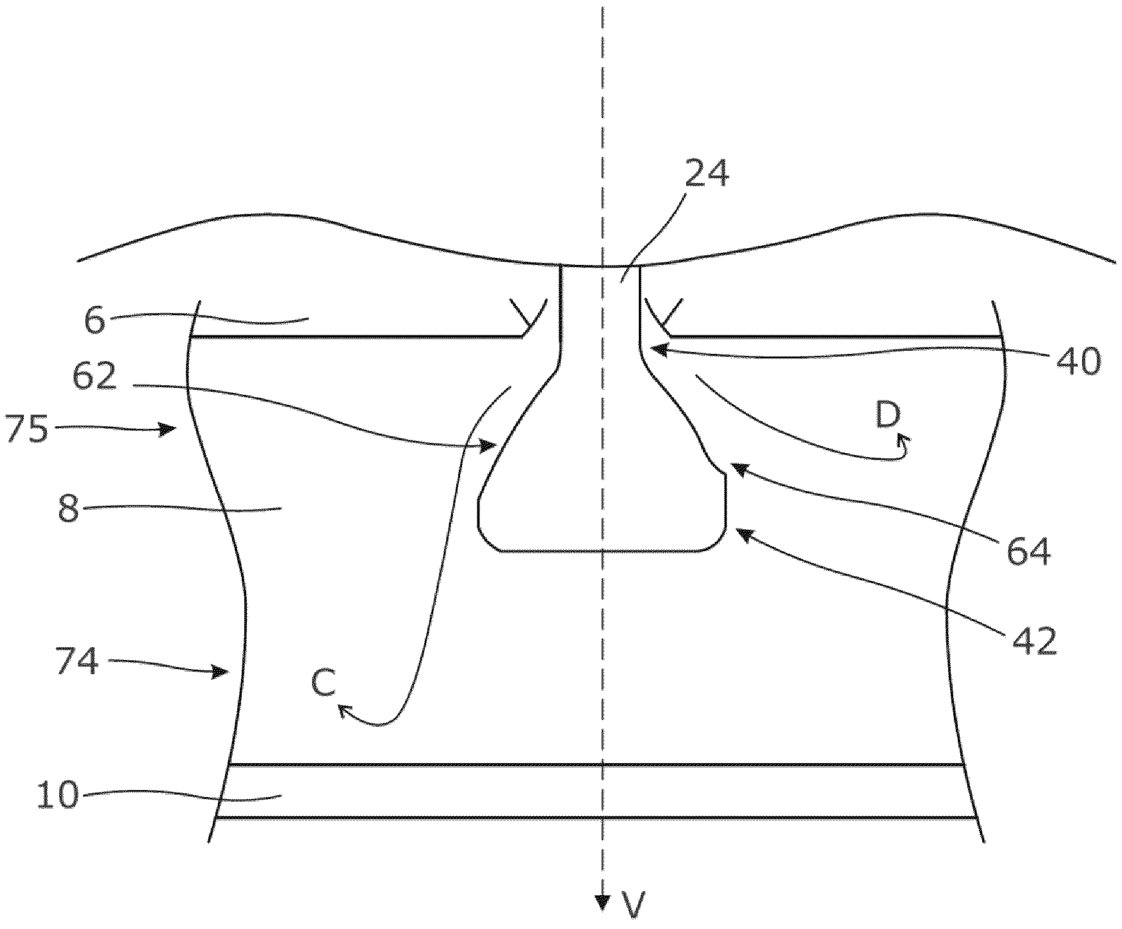
Figure 10:
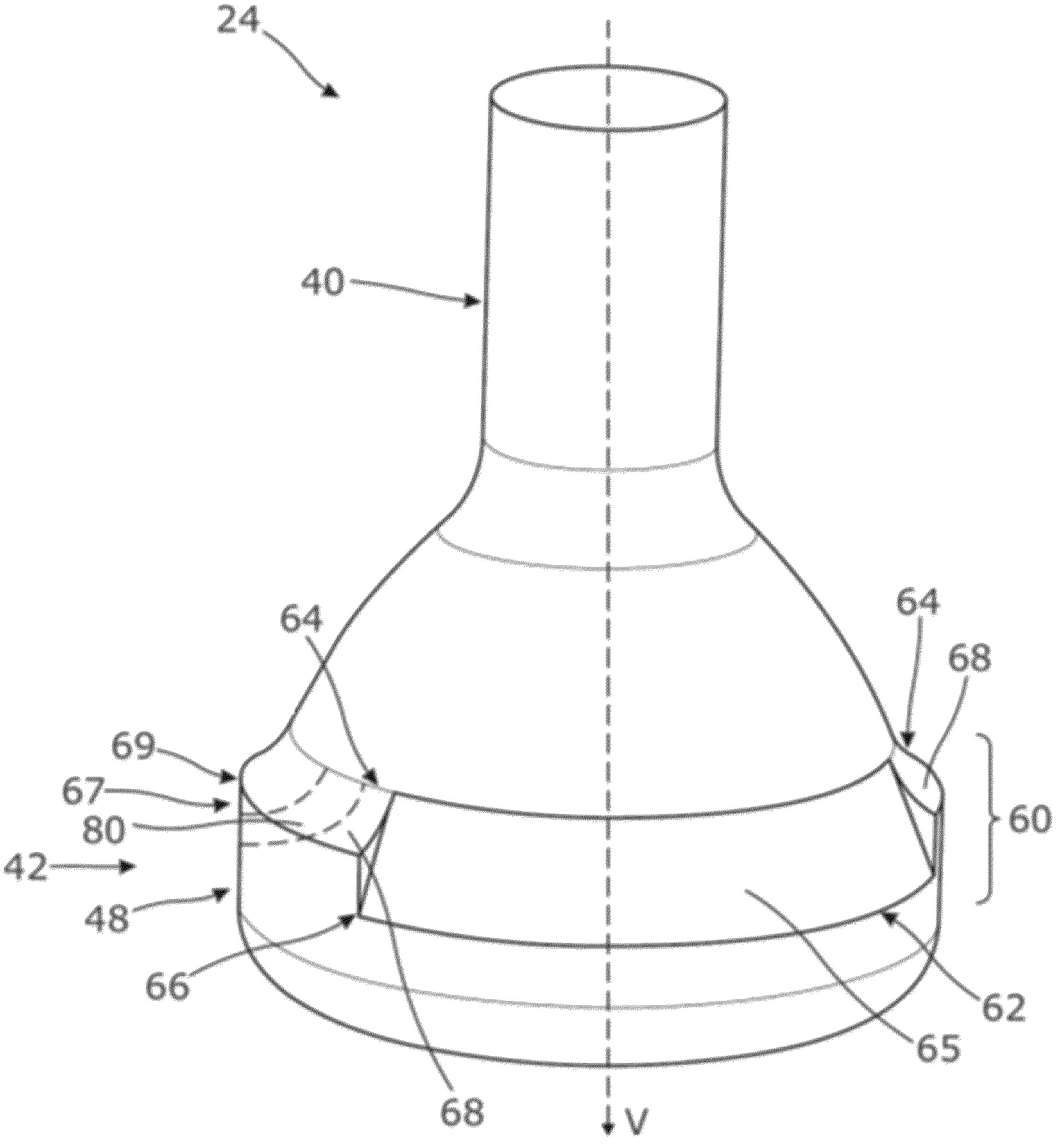
Figure 11:
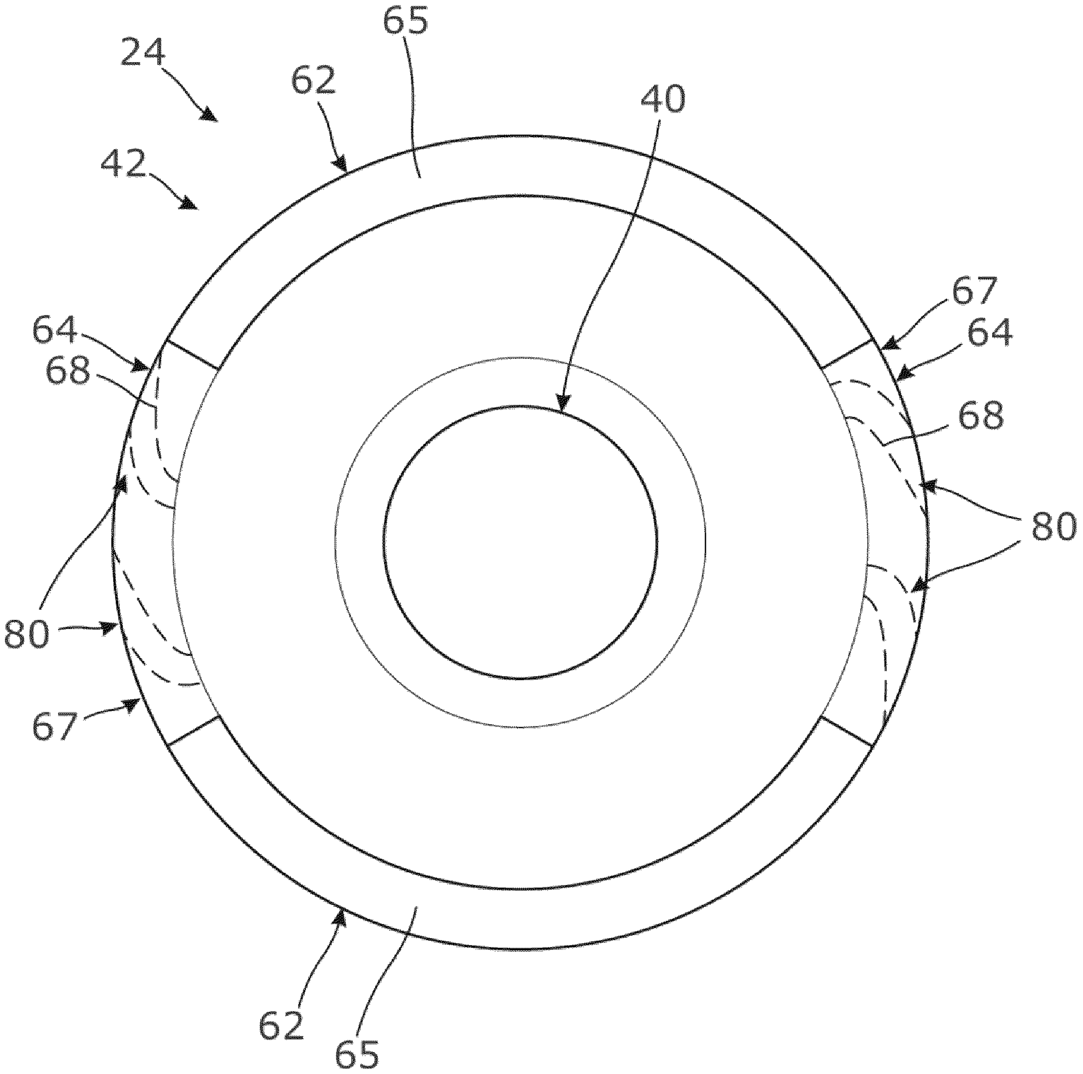

So that the invention may be better understood, reference will now be made by way of example only to the following drawings in which:

FIG. 2 is a schematic view of a fuel injector arranged in part of an internal combustion engine in which examples of the invention may be incorporated;

FIG. 3 is a perspective view of a first embodiment of an injection valve needle of the fuel injector of FIG. 2;

FIG. 4 is a top-down view of the injection valve needle of FIG. 3;

FIG. 5*a* is a cross-sectional side view of the injection valve needle of FIG. 4 along plane I-I;

FIG. 5*b* is a cross-sectional side view of the injection valve needle of FIG. 4 along plane II-II;

FIG. 6 is a perspective view of a second embodiment of an injection valve needle of the fuel injector of FIG. 2;

FIG. 7 is a top-down view of the injection valve needle of FIG. 6;

FIG. 8*a* is a cross-sectional side view of the injection valve needle of FIG. 7 along plane I-I;

FIG. 8*b* is a cross-sectional side view of the injection valve needle of FIG. 7 along plane II-II;

FIG. 9 is a representation showing the flow of gaseous fuel over a third embodiment of an injection valve needle of the fuel injector of FIG. 2;

FIG. 10 is a perspective view of the injection valve needle of FIG. 3, wherein the injection valve needle is further provided with at least one curved flute; and FIG. 11 is a top-down view of the injection valve needle of FIG. 10.

In the figures, the fuel injector 4 is illustrated in an up-right configuration, i.e. in the orientation in which the fuel injector 4 would be arranged above the combustion chamber 8, and in which the injection valve needle extends substantially down. All references to 'upper', 'lower', 'upward', 'downward', 'up', 'down' etc are with reference to this up-right orientation. A 'V' axis is used to refer to a particular direction in the figures, i.e. the generally vertical direction down. The injection valve needle extends in this direction and gaseous fuel therein is directed generally in this direction, i.e. downstream, through the injection valve needle and into the combustion chamber 8. Angles defined with respect to the injection valve axis V are defined with respect to the injection valve axis V as it extends downward.

DETAILED DESCRIPTION OF THE EMBODIMENTS

FIG. 2 shows part of an internal combustion engine 2 for combusting gaseous fuels such as hydrogen. A fuel injector 4 is mounted in a cylinder head 6 of the internal combustion engine 2 and is arranged to inject fuel into a combustion chamber 8 of the internal combustion engine 2.

The fuel injector 4 comprises an elongated injection valve housing or 'nozzle' 20 defining an internal opening 22, an injection valve needle or 'pintle' 24 that is slidably received within the internal opening 22, and an actuator arrangement 26 that is configured to act on the valve needle 24 so as to move the injection valve needle 24 relative to the injection nozzle 20. An annular chamber 26 is defined between the nozzle 20 and the valve needle 24. The annular chamber 26 receives gaseous fuel from a supply of fuel (not shown) for injection into the combustion chamber 8.

A tip region 28 of the nozzle 20 defines a closable central outlet opening 30 connecting the internal opening 22 of said injection nozzle 20 and the combustion chamber 8. Depending on the relative position of the injection valve needle 24 with respect to the injection nozzle 20, the central outlet opening 30 is either open, in which case fuel in the annular chamber 26 is directed through the central outlet opening 30 and into the combustion chamber 8, or closed in which case fuel in the annular chamber 26 is prevented from passing through the central outlet opening 30 into the combustion chamber 8.

Each of the components of the fuel injector 4, the injection nozzle 20, the injection valve needle 24 and the actuator arrangement 26 will now be described in turn.

Firstly, the injection nozzle 20 will be overviewed.

The injection nozzle 20 is held in a passage or bore 32 of the cylinder head 6, said passage 32 being shaped to receive the injection nozzle 20 in a relatively loose fit. At the tip region 18 of the nozzle 20, the nozzle 20 is provided with an annular valve seat 34 that defines the central outlet opening 30 defined above. The annular valve seat 34 is able to form a seal with the valve needle 24 when the valve needle 24 is abutted thereagainst.

Secondly, the valve needle 24 will be overviewed.

The valve needle 24 comprises a valve stem 40 that extends downwards in a valve axis V and a valve head 42 extending from the valve stem 40 at an end of the valve stem 40 adjacent to the combustion chamber 8. The valve needle 24 is of the outward opening type, meaning that the valve head 42 extends radially outward relative to the valve stem 40 to define a bulb at the end of the valve needle 24 adjacent to the combustion chamber 8. The valve head 42 generally becomes wider towards the end of the valve needle 24 adjacent to the combustion chamber 8.

The bulbous valve head 42 defines a circumferential sealing region 44 which is arrangeable to abut and seal against the annular valve seat 34 of the injection nozzle 20. In other words, the circumferential sealing region 44 of the valve needle 24 and the valve seat 34 of the nozzle 20 are correspondingly shaped to allow a tight seal to be performed therebetween.

In the closed configuration, the valve needle 24 is arranged in relatively upward position with respect to the nozzle 20 such that the circumferential sealing region 44 of the valve needle 24 seals against the valve seat 34 of the nozzle 20, thereby blocking the central outlet opening 30 and preventing fuel being delivered through it. In the open configuration, the valve needle 24 is arranged in a relatively downward position with respect to the nozzle 20 such that an annular gap 46 is formed between the valve needle 24 and the nozzle 20, thereby opening the central outlet opening 30 and allowing fuel to be delivered through it. The narrow annular gap 46 arrangement shapes the flow of fuel into a conical jet.

The circumferential sealing region 44 is arranged above and away from the widest part 48 of the valve head 42, i.e. the outermost radial extent of the valve head 42. In other words, the diameter of the circumferential sealing region 44 is less that the diameter of the valve head 42 at its widest point 48. In this way, part of the valve head 42, i.e. a lower, wider part, is always arranged below the central outlet opening 30 and within the combustion chamber 8 of the internal combustion engine 2.

Thirdly, the actuator arrangement 26 will be overviewed.

The actuator arrangement 26 is configured to control the movement of the valve needle 24 with respect to the nozzle 20, and hence control whether the fuel injector 4 is in the above-described closed and open configurations.

To this end, the actuator arrangement 26 comprises a closure spring 50 which biases the valve needle 24 upward such that the sealing region 44 of the valve needle 24 seals against the valve seat 34, and the fuel injector 4 is closed. Actuation of the valve needle 24 into the open arrangement can be achieved by way of an electromagnetic actuator 52 of the actuator arrangement 26, although, other forms of actuation are acceptable, such as piezoelectric actuators. On actuation, the valve needle 24 is directed downward and the valve head 42 is moved outwardly from the nozzle 20 such that the sealing region 44 of the valve needle 24 no longer seals against the valve seat 34, and the narrow annular gap 46 is defined between the valve needle 24 and the valve seat 34, through which the gaseous fuel can be delivered into the combustion chamber 8 for combustion. The distance by which the valve needle 24 is moved downwards is known as "needle stroke".

It will be appreciated how the valve needle 24 is arranged to move downwards in order to initiate a delivery of fuel, and upwards to terminate fuel delivery. The direction of gaseous fuel flow through the injector 4 is the same direction as the movement of the valve needle 24 between the closed and open configurations. Therefore, the valve needle 24 moves in the same direction as the flow of fuel through the nozzle 20 during an injection event.

This invention relates to a circumferential fuel guide region 60 that is provided around the valve head 42 downstream from the circumferential sealing region 44 i.e. about or near the widest point 48 of the valve head 42. This region 60 will now be described in more detail with reference also to FIGS. 3 to 8*b*.

When the valve needle 24 is arranged in the open configuration, fuel passes over this circumferential fuel guide region 60 before exiting the fuel injector 4 into the combustion chamber 8. Because of the configuration of the circumferential fuel guide region 60, fuel is directed in different directions within the combustion chamber 8. In this way, fuel is dispersed more efficiently around the cylinder head 6 such that more efficient mixing with air in the combustion chamber 8 is achieved, thereby improving combustion efficiency.

To this end, the circumferential fuel guide region 60 is provided with a first guide portion 62 and a second guide portion 64, each partially extending around the circumferential fuel guide region 60.

The first guide portion 62 is shaped to guide fuel injection at a first angle θ with respect to the injection valve axis V, while the second guide portion 64 is shaped to guide fuel injection at a second angle φ with respect to the injection valve axis V. As the first angle θ associated with the first guide portion 62 is smaller than the second angle φ associated with the second guide portion 64, the first guide portion 62 directs part of the fuel towards a lower half 74 of the combustion chamber 8, i.e. towards and/or near a piston 10 of the internal combustion engine 2, while the second guide portion 64 directs another part of the fuel towards an upper half 75 of the combustion chamber 8 i.e. towards and/or near the cylinder head 6 of the internal combustion engine. In this way, fuel is directed in all parts of the combustion chamber 8, and hence more efficient mixing with air in the combustion chamber 8 is achieved.

Two different embodiments of the circumferential fuel guide region 60 will now be described with further reference to FIGS. 3 to 8*b*.

The first embodiment is depicted in FIGS. 3 to 5*b*.

In this first embodiment, the circumferential fuel guide region 60 includes two first guide portions 62 and two second guide portions 64, each arranged on directly opposite sides of the valve head 42. As such, the first and second guide portions 64 alternate around the circumferential fuel guide region 60 of the valve head 42. Each of the first guide portions 62 extend circumferentially over a first subtended angle α while each of the second guide portions extend circumferentially over a second subtended angle β.

Between the circumferential fuel guide region 60 and the circumferential sealing region 44 is a circumferential common region 49 that extends entirely around the circumferential fuel guide region 60 on all sides. The circumferential common region 49 defines a common surface that is the same shape on all sides of the valve head 42, i.e. it is rotationally symmetrical about the valve axis V.

The common surface 49 is substantially convex with respect to the valve axis V. In other words, the common surface 49 curves outwards from the circumferential sealing region 44. That is to say, the common surface begins, i.e. near the sealing region 44, at a relatively flat angle with respect to the valve axis V, and said curvature becomes more steep as you move down and away from the sealing region 44 and towards the fuel guide region 60, thereby providing a bowed or bent surface therebetween. The circumferential fuel guide region 60 intersects with the circumferential sealing region 44 at a circumferential intersection region 49*a*.

Each first guide portion 62 defines a first guide surface 65 that is also substantially convex with respect to the valve axis V, i.e. that also curves outwards. That is to say, the curved surface 62 begins, i.e. near the circumferential intersection region 49*a*, at a relatively flat angle with respect to the valve axis V, and said curvature becomes more steep as you move down and away from said circumferential intersection region 49*a*, thereby providing a bowed or bent surface.

In this way, the first guide surface 65 forms a relatively small angle θ with respect to the valve axis V at a widest part 66 thereof, said angle θ being defined between the valve axis V and a tangent of the outermost radial extent 66 of the first guide surface 65. Accordingly, each first guide portion 62 directs fuel at a relatively small angle θ with respect to the valve axis V.

Each second guide portion 64 is provided with a projection or lobe 67 that extends more radially outward than the first guide portion 62. Furthermore, each projection 67 defines a substantially concave second guide surface 68 with respect to the valve axis V. In other words, the second guide surface 68 curves inwards. That is to say, the curved surface 68 begins, i.e. near the circumferential intersection region 49*a*, at a relatively steep angle with respect to the valve axis V, and said curvature lessens as you move down and away from said circumferential intersection region 49*a*.

As such, the projection 67 takes the form a concave or curved ramp that extends out from the valve head 42. In this way, the second guide surface 68 forms a relatively large angle φ with respect to the valve axis V at a widest part 69 thereof, said angle φ being defined between the valve axis V and a tangent of the outermost radial extent 69 of the second guide surface 68. As such, the second guide portion 64 directs fuel at a relatively large angle φ with respect to the valve axis V.

In this way, each first guide portion 62 guides fuel injection at a smaller angle with respect to the valve axis V than the second guide portion 64. Accordingly, the circumferential fuel guide region 60 directs part of the fuel flowing thereover towards the lower half 74 of the combustion chamber 8, by the first guide portions 62, and the remainder of the fuel is directed towards the upper half 75 of the combustion chamber 8, by the second guide portions 64.

In a preferred embodiment, the angle θ is between 30° and 90°, more preferably between 50° and 85°, and most preferably between 60° and 80°, whereas the angle φ is between 100° and 150°, more preferably between 110° and 140°, and even more preferably between 120° and 130°. However, a particularly effective jet separation can be achieved so long as the difference between angle θ and angle φ is at least 40°.

As best seen in FIG. 3, the narrowest part 70 of each first guide portion 62, i.e. the innermost radial extent 70 of each first guide portion 62, is as wide as the narrowest part 71 of each second guide portion 64, i.e. the innermost radial extent 71 of each second guide portion 64, and this occurs adjacent to the circumferential intersection region 49*a*. In other words, each of the narrowest parts 70, 71 of the first and second guide portions 62, 64 extends the same radial distance from the valve axis V adjacent to the circumferential intersection region 49*a*.

Likewise, the widest part 66 of each first guide portion 62, i.e. the outermost radial extent 66, of each first guide portion 62, is as wide as the widest part 69 of each second guide portion 64, i.e. the outermost radial extent 69, of each second guide portion 64, and this corresponds with the widest portion 48 of the valve head 42. In other words, each of the widest portions of the first and second guide portions 62, 64 extends the same radial distance from the valve axis V and so does the widest portion 48 of the valve head 42.

Between the circumferential intersection region 49*a* and the widest portion 48 of the valve head 42, the first guide surface 65 defines a slope that increases gradually in diameter until its widest part 66 is defined, whereas the second guide region increases sharply in diameter until its widest part 69 is defined, i.e. it flares outwardly with respect to the first guide portion, reaching its widest part 69 more quickly than the first guide surface 65. Thereafter, the second guide region extends substantially downward. in this way, the widest part 66 of the first guide portion 62 is located downstream of at least a portion of the widest part 69 of the second guide portion 64.

The relative radial positions of the widest part 69 of the second guide portion 64 (corresponding to the widest part 66 of the first guide portions 62), the circumferential intersection region 49*a*, and the circumferential sealing region 44 will now be discussed. As best shown in FIGS. 5A and 5B, the radial positions γ, ε, δ relate to each of the second guide portion widest part 69, the circumferential intersection region 49*a*, and the circumferential sealing region 44 respectively.

It has been found that when the radial distance between the widest part 69 of second guide portion 64 and the circumferential intersection region 49*a* (i.e. between γ and δ) is at least 10% of the total radial distance between the widest part 69 of second guide portion 64 and the circumferential sealing region 44 (i.e. between γ and ε), and/or is at least of 10% of the maximum needle stroke, an advantageous fuel guiding separation effect achieved by the first and second guide portions 62, 64, and fuel is directed in different directions within the combustion chamber 8, thereby causing thorough fuel-air mixing therein. In other words, the projection 67 of the second guide portion 64 preferably radially extends with respect to the first guide portion 62 by at least 10% of the total radial extension of the valve head 42 downstream of the circumferential sealing region 44 and/or the maximum needle stroke.

More preferably, the projection 67 radially extends by at least 15%, even more preferably by at least 25%, and most preferably by at least 30% of the total radial extension of the valve head 42 downstream of the circumferential sealing region 44 and/or the maximum needle stroke. Typically, each of the total radial extension of the valve head 42 downstream of the circumferential sealing region 44 and the maximum needle stroke is around between from 200 to 600 microns.

This shape of the valve head 42 of the first embodiment may be manufactured in various ways.

In one approach the valve head 42 could be manufactured so as to have continuous rotational symmetry that corresponds to the first guide portion 62. Suitable features defining the second guide portion 64 may then be formed by way of an additive manufacturing process.

In another approach, the valve head 42 could be manufactured so as to have continuous rotational symmetry that corresponds to the second guide portion 64. Suitable features defining the first guide portion 62 may then be formed by way of a subtractive manufacturing process.

To ensure that the first and second guide portions 62, 64 are made to the right sizes and shapes, a computerised tomography (CT) scan or a Micronor contact measurement can be used to provide the necessary measurements. Alternatively, a 5-axis coordinate measurement machine, such as a Renishaw measurement probe could be used.

The second embodiment is shown in FIGS. 6 to 8*b*.

The second embodiment is different form the first in that the widest part 66 of each first guide portion 62 is narrower than the widest part 69 of each second guide portion 64. In other words, each of the widest portions 66, 69 of the first and second guide portions 62, 64 extends different radial distances from the valve axis V, the first guide portion 62 extending radially outward by a smaller amount relative to the second guide portion 64.

In addition to having the first and second guide portions 62, 64 extending the same radial distance from the valve axis V adjacent to the circumferential intersection region 49*a*, i.e. above the widest parts 66, 69, the first and second guide portions 62, 64 also extend the same radial distance from the valve axis V at a circumferential under region arranged below the widest parts 66, 69. At each axial position between the circumferential intersection region 49*a* and the circumferential under region 73, the second guide portion 64 is radially wider than the first guide portion 62.

To this end, the projection or lobe 67 associated with the second guide portion 64 takes the form an annulus portion or sector that extends out of the valve head 42. Said projection 67 is located on the same perpendicular plane to the valve axis V as the widest part 66 of the first guide portion 62. In other words, the first guide portion 62 and the second guide portion 64 are arranged on the same perpendicular plane to the valve axis V.

The relative radial positions of the widest part 69 of the second guide portion 64, the widest part 66 of the first guide portion 62 and the circumferential sealing region 44 will now be discussed. As best shown in FIGS. 8A and 8B, the radial positions $\gamma_1$, $\gamma_2$, ε relate to each of the second guide portion widest part 69, the first guide portion widest part 66, and the circumferential sealing region 44 respectively.

It has been found that when the radial distance between the widest part 69 of second guide portion 64 and the widest part 66 of the first guide portion 62 (i.e. between $\gamma_1$ and $\gamma_2$) is at least 10% of the total radial distance between the widest part 69 of second guide portion 64 and the circumferential sealing region 44 (i.e. between $\gamma_1$ and ε), and/or is at least of 10% of the maximum needle stroke, an advantageous fuel guiding separation effect achieved by the first and second guide portions 62, 64, and fuel is directed in different directions within the combustion chamber 8, thereby causing thorough fuel-air mixing therein. In other words, the projection 67 of the second guide portion 64 preferably radially extends with respect to the first guide portion 62 by at least 10% of the total radial extension of the valve head 42 downstream of the circumferential sealing region 44 and/or at least of 10% of the maximum needle stroke.

More preferably, the projection 67 radially extends by at least 15%, even more preferably by at least 25%, and most preferably by at least 30% of the total radial extension of the valve head 42 downstream of the circumferential sealing region 44. Typically, each of the total radial extension of the valve head 42 downstream of the circumferential sealing region 44 and the maximum needle stroke is around between from 200 to 600 micron.

This shape of the valve head 42 of the second embodiment may be manufactured in various ways.

In one approach the valve head 42 could be manufactured so as to have continuous rotational symmetry that corresponds to the first guide portion 62. Suitable features defining the second guide portion 64 may then be formed by way of an additive manufacturing process.

In another approach, the valve head 42 could be manufactured so as to have continuous rotational symmetry that corresponds to the second guide portion 64. Suitable features defining the first guide portion 62 may then be formed by way of a subtractive manufacturing process.

To ensure that the first and second guide portions 62, 64 are made to the right sizes and shapes, a computerised tomography (CT) scan or a Micronor contact measurement can be used to provide the necessary measurements. Alternatively, a 5-axis coordinate measurement machine, such as a Renishaw measurement probe could be used.

Commonalties shared among both embodiments will now be overviewed.

As is clear from both FIG. 4 and FIG. 7, in both embodiments, the first guide portions 62 extend circumferentially over a larger subtended angle than the second guide portions 64. This ensures that more of the fuel is directed towards the bottom half of the combustion engine 2.

During compression, the piston 10 directs some of this fuel back up to the top half of the combustion engine 2. Hence, this arrangement advantageously compensates for this imbalance, by directing more of the fuel downward. As a result, a more uniform dispersal of the fuel throughout both the upper and lower halves of the combustion engine 2.

In a preferred embodiment, the first subtended angle is preferably between 100° and 150°, more preferably between 110° and 140°, and even more preferably between 120° and 130°, whereas the second subtended angle is preferably between 30° and 80°, more preferably between 40° and 70°, and most preferably between 50° and 60°.

The circumferential projections 67 on the valve head 42 can be manufactured using asymmetric machining processes such as a subtractive and/or additive manufacturing process, for example as outlined above. Alternatively, it is envisaged that additive manufacturing processes can be used to manufacture the valve head 42 in its entirety.

FIG. 9 shows the flow of gaseous fuel over a third embodiment of the injection valve needle 24. In this embodiment, the first and second guide portions 62, 64 of the first embodiment are arranged on opposite sides of the valve head 42. The first guide portion 62 directs a portion C of the fuel towards the piston, i.e. towards the lower half 74 of the combustion chamber 8, whereas the second guide portion 64 directs a portion D of the fuel towards the cylinder head, i.e. towards the upper half 75 of the combustion chamber 8.

Some variants on the specific embodiments have already been described. However, the skilled person would appreciate that further modifications could be made to the specific embodiments that do not depart from the scope of the invention as defined by the claims.

For example, the circumferential fuel guide region 60 may contain just one first guide portion 62 and second guide portion 64, or indeed any number of each. Where there is a plurality of guide portions 62, 64, the first and second guide portions 62, 64 preferably alternate around the fuel guide region 60. In one preferred embodiment, the fuel guide region 60 comprises at least one pair of first guide portions 62 and at least one pair of second guide portions 64, and each pair of first and second guide portions 62, 64 is arranged on opposite sides of the valve head 42. This symmetrical arrangement facilitates manufacture of the injection valve needle 24.

In one preferred embodiment shown in FIGS. 10 and 11, the circumferential projections 67 of the first and second embodiments are provided with at least one curved flute 80 that is carved, or inset, into the projections 67. Since these flutes 80 are curved around, i.e. the extend at least partially circumferentially around the valve head 42, and extend downstream along the injection valve axis V, they impart rotational swirl to the injection fuel passing thereover. This beneficially further improves mixing between the air and the fuel in the combustion chamber 8.

The invention claimed is:

1. A fuel injector suitable for gaseous fuels, the fuel injector comprising:

an injection nozzle having a tip region that is shaped to define an annular valve seat that extends about a central outlet opening; and an outward opening injection valve needle slidably received in the injection nozzle, and operable to move between closed and open positions, the outward opening injection valve needle comprising a valve stem that defines a valve axis and a valve head extending from the valve stem, wherein the valve head comprises:

a circumferential sealing region configured to seal against the valve seat and close the central outlet opening in the closed position and to define an annular gap with the valve seat in the open position, and a circumferential fuel guide region that is located downstream from the circumferential sealing region, the circumferential fuel guide region including a first guide portion defining a first guide surface and a second guide portion defining a second guide surface, wherein the first guide portion is configured to guide fuel injection at a smaller angle with respect to the valve axis than the second guide portion, wherein the first guide portion extends circumferentially over a first subtended angle $\alpha$ and the second guide portion extends circumferentially over a second subtended angle $\beta$, and wherein the first subtended angle $\alpha$ is larger than the second subtended angle $\beta$, and the first subtended angle $\alpha$ is between 100° and 150° and the second subtended angle $\beta$ is between 30° and 80°, and wherein a first angle $\theta$ is defined between a tangent of an outermost radial extent of the first guide surface and the valve axis, and a second angle $\varphi$ is defined between a tangent of the outermost radial extent of the second guide surface and the valve axis, and wherein the first angle $\theta$ is less than the second angle $\varphi$, and the first angle $\theta$ is between 30° and 90° and the second angle $\varphi$ is between 100° and 150°.

2. The fuel injector of claim 1, wherein the difference between the second angle $\varphi$ and the first angle $\theta$ is at least 40°.

3. The fuel injector of claim 1, wherein the second guide portion comprises a projection that extends radially outward with respect to the first guide portion to define the second guide surface.

4. The fuel injector of claim 3, wherein the projection extends radially outward with respect to the first guide portion by at least 10% of a total radial extension of the valve head downstream of the circumferential sealing region.

5. The fuel injector of claim 3, wherein the projection extends radially outward with respect to the first guide portion by at least 10% of a maximum needle stroke of the injection valve needle.

6. The fuel injector of claim 3, wherein the projection takes the form of a curved ramp or annulus portion.

7. The fuel injector of claim 1, wherein the first guide surface is substantially convex, and wherein the second guide surface is substantially concave.

8. The fuel injector of claim 1, wherein the valve head further comprises a circumferential common region that extends between the circumferential sealing region and the circumferential fuel guide region, and wherein the circumferential common region is rotationally symmetrical with respect to the valve axis.

9. The fuel injector of claim 8, wherein the circumferential common region defines a common surface that is substantially convex.

10. The fuel injector of claim 1, wherein the fuel guide region comprises at least one pair of first guide portions and at least one pair of second guide portions, and wherein each pair of first and second guide portions is arranged on opposite sides of the valve head.

11. The fuel injector of claim 1, wherein at least one flute is defined within the first and/or second guide portions for imparting rotational swirl to gaseous fuel passing thereover.

12. An internal combustion engine for gaseous fuels comprising, a cylinder head, a piston and an engine combustion chamber, a fuel injector of any preceding claim arranged in said cylinder head and configured to guide fuel injection into the engine combustion chamber for combustion, wherein the first guide portion is configured to guide the injection jet towards the lower half of the combustion chamber and the second guide portion is configured to guide the injection jet towards the upper half of the combustion chamber.

* * * * *